(12) United States Patent
Jain

(10) Patent No.: US 9,516,665 B2
(45) Date of Patent: Dec. 6, 2016

(54) RAT SELECTION BASED ON APPLICATION PREFERENCE

(71) Applicant: QUALCOMM Incorporated, San Diego, CA (US)

(72) Inventor: Sachin Jain, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 14/613,329

(22) Filed: Feb. 3, 2015

(65) Prior Publication Data

US 2016/0227558 A1    Aug. 4, 2016

(51) Int. Cl.
  *H04W 72/12* (2009.01)
  *H04W 48/18* (2009.01)
  *H04W 88/06* (2009.01)
  *H04W 76/06* (2009.01)

(52) U.S. Cl.
  CPC ......... *H04W 72/1215* (2013.01); *H04W 48/18* (2013.01); *H04W 76/06* (2013.01); *H04W 88/06* (2013.01)

(58) Field of Classification Search
  None
  See application file for complete search history.

(56) References Cited

U.S. PATENT DOCUMENTS

| 7,848,756 | B2 | 12/2010 | Nader et al. | |
|---|---|---|---|---|
| 8,391,918 | B2 | 3/2013 | Ekici et al. | |
| 8,811,187 | B2 | 8/2014 | Macias et al. | |
| 9,014,703 | B1* | 4/2015 | Edara | H04W 28/10 455/445 |
| 2002/0087674 | A1* | 7/2002 | Guilford | H04W 48/18 709/223 |
| 2008/0311912 | A1* | 12/2008 | Balasubramanian | H04W 48/18 455/436 |
| 2009/0067368 | A1 | 3/2009 | McAndrews et al. | |
| 2010/0075665 | A1* | 3/2010 | Nader | H04J 11/0093 455/426.1 |
| 2010/0216469 | A1* | 8/2010 | Yi | H04W 48/20 455/435.3 |
| 2011/0059739 | A1* | 3/2011 | Huang | H04W 48/18 455/435.1 |

(Continued)

OTHER PUBLICATIONS

International Search Report and Written Opinion—PCT/US2015/063023—ISA/EPO—Feb. 15, 2016.

*Primary Examiner* — Bunjob Jaroenchonwanit

(74) *Attorney, Agent, or Firm* — Arent Fox LLP

(57) ABSTRACT

A method, an apparatus, and a computer program product for wireless communication are provided. The apparatus may be a UE. The UE communicates with one or more base stations. The UE determines a first preferred RAT of a first application. The UE determines an RAT used on a first carrier in communication with the one or more base stations. The UE selectively allows and disallows the first application to communicate data with the one or more base stations on the first carrier based on the RAT used on the first carrier and the first preferred RAT.

22 Claims, 12 Drawing Sheets

(56) References Cited

U.S. PATENT DOCUMENTS

| | | | | |
|---|---|---|---|---|
| 2011/0075635 A1* | 3/2011 | Ryu | ............... | H04W 36/14 370/332 |
| 2013/0136115 A1* | 5/2013 | Moisanen | ............... | H04W 76/027 370/338 |
| 2013/0201847 A1* | 8/2013 | Chincholi | ............... | H04W 28/08 370/252 |
| 2013/0308481 A1* | 11/2013 | Kazmi | ............... | H04W 24/02 370/252 |
| 2013/0322300 A1 | 12/2013 | Landais et al. | | |
| 2013/0329639 A1* | 12/2013 | Wietfeldt | ............... | H04W 88/06 370/328 |
| 2014/0080503 A1* | 3/2014 | Issakov | ............... | H04W 24/00 455/456.1 |
| 2014/0133294 A1* | 5/2014 | Horn | ............... | H04W 28/0247 370/230 |
| 2014/0219119 A1* | 8/2014 | Ishida | ............... | H04W 24/10 370/252 |
| 2014/0335880 A1* | 11/2014 | Lindoff | ............... | H04W 52/50 455/452.1 |
| 2015/0003243 A1* | 1/2015 | Klingenbrunn | ............... | H04W 76/041 370/230 |
| 2015/0079978 A1* | 3/2015 | Guilford | ............... | H04W 28/08 455/432.1 |
| 2015/0208458 A1* | 7/2015 | Pelletier | ............... | H04W 72/0453 370/329 |
| 2015/0237560 A1* | 8/2015 | Saida | ............... | H04W 36/365 370/331 |
| 2016/0142960 A1* | 5/2016 | Liu | ............... | H04B 1/3816 455/436 |

\* cited by examiner

RAT SELECTION BASED ON APPLICATION PREFERENCE

BACKGROUND

Field

The present disclosure relates generally to communication systems, and more particularly, to techniques of providing cellular network connections to applications on a user equipment (UE) based on application preferences.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a UE. The UE communicates with one or more base stations. The UE determines a first preferred radio access technology (RAT) of a first application. The UE determines an RAT used on a first carrier in communication with the one or more base stations. The UE selectively allows and disallows the first application to communicate data with the one or more base stations on the first carrier based on the RAT used on the first carrier and the first preferred RAT.

DETAILED DESCRIPTION

Figure 1:
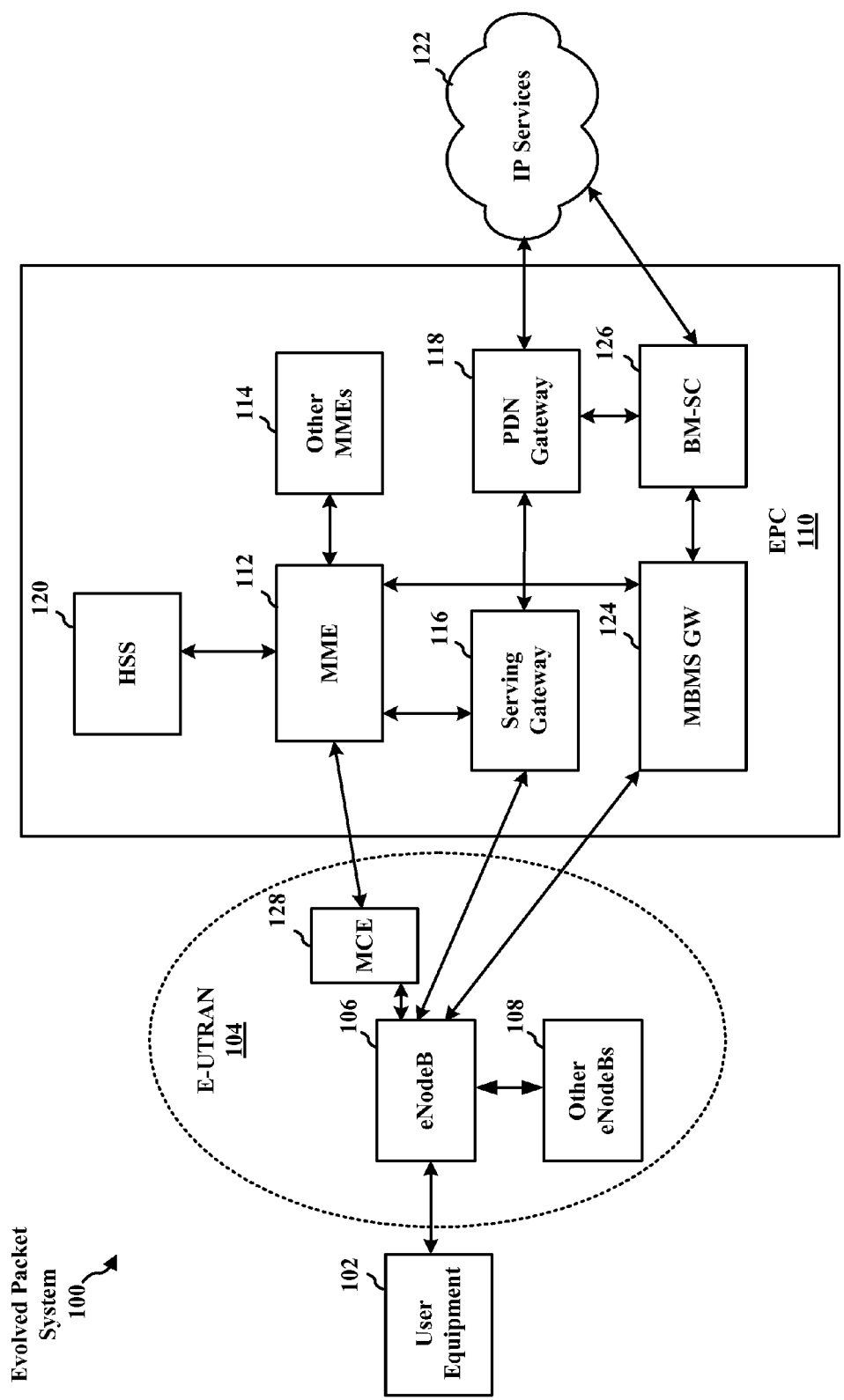
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a

Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
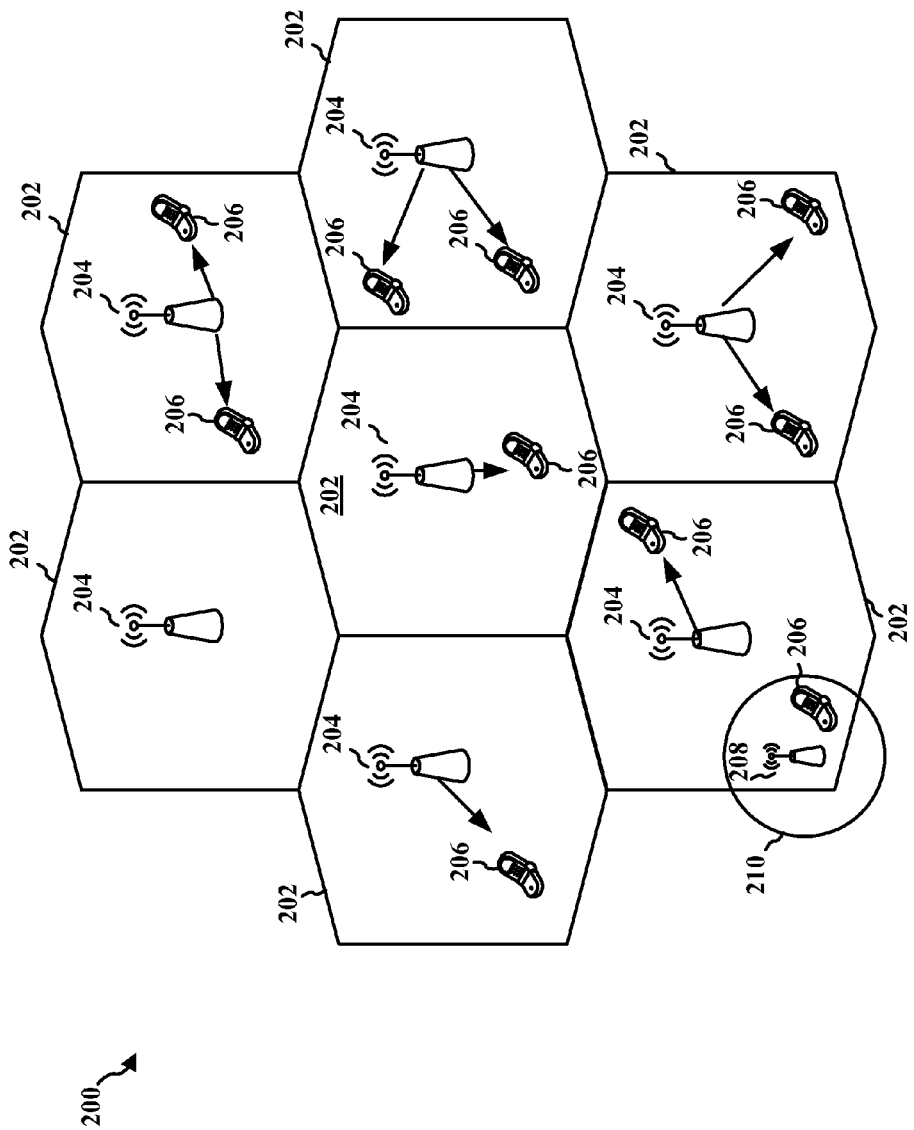
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
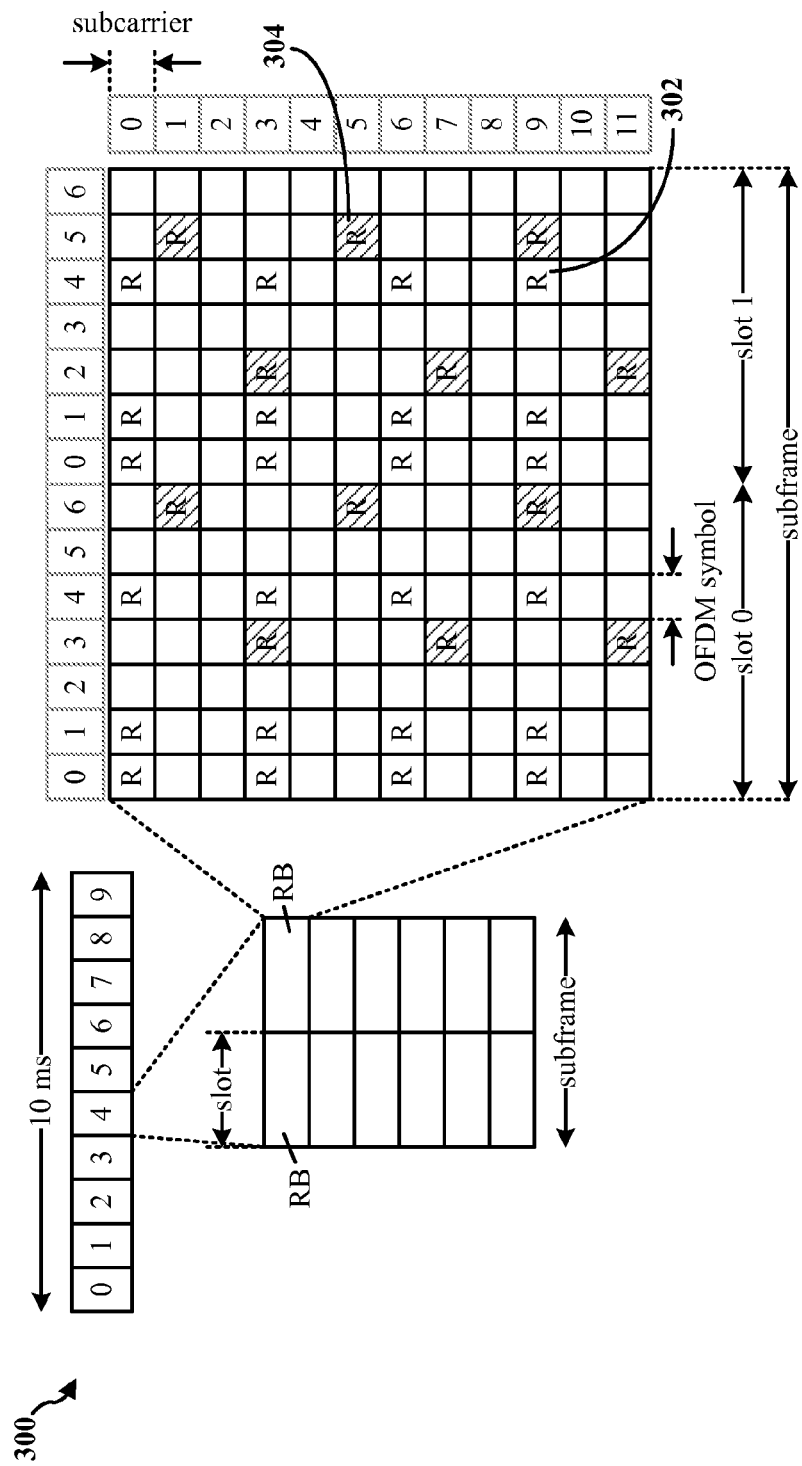
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
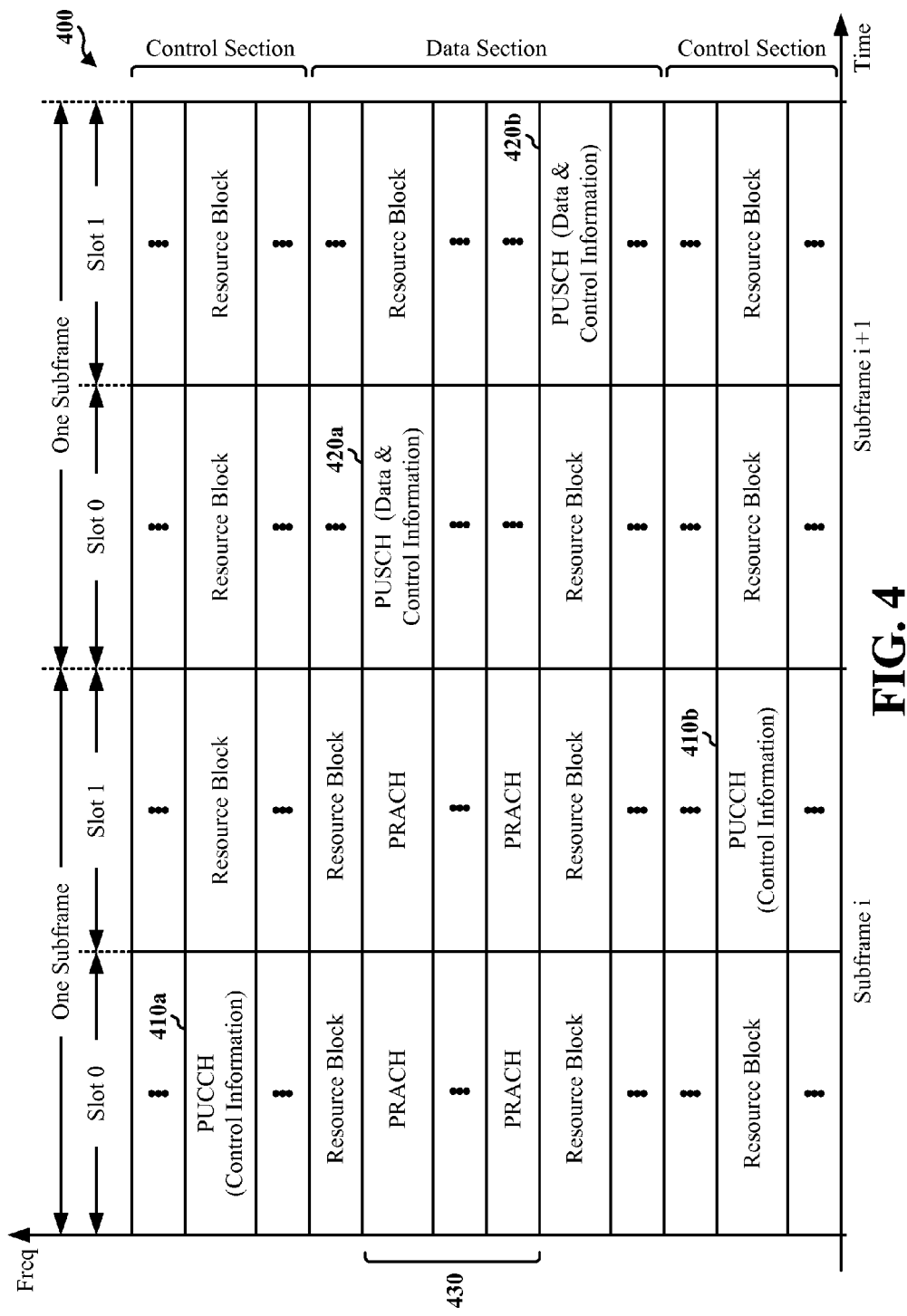
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
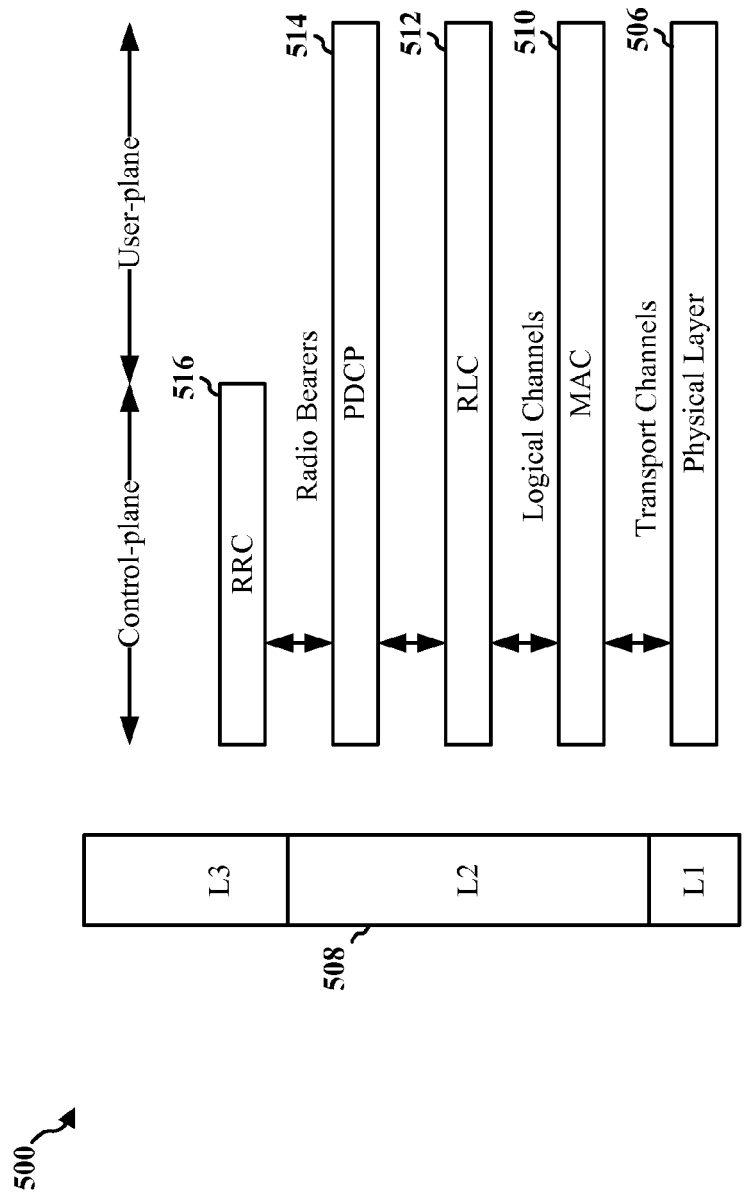
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
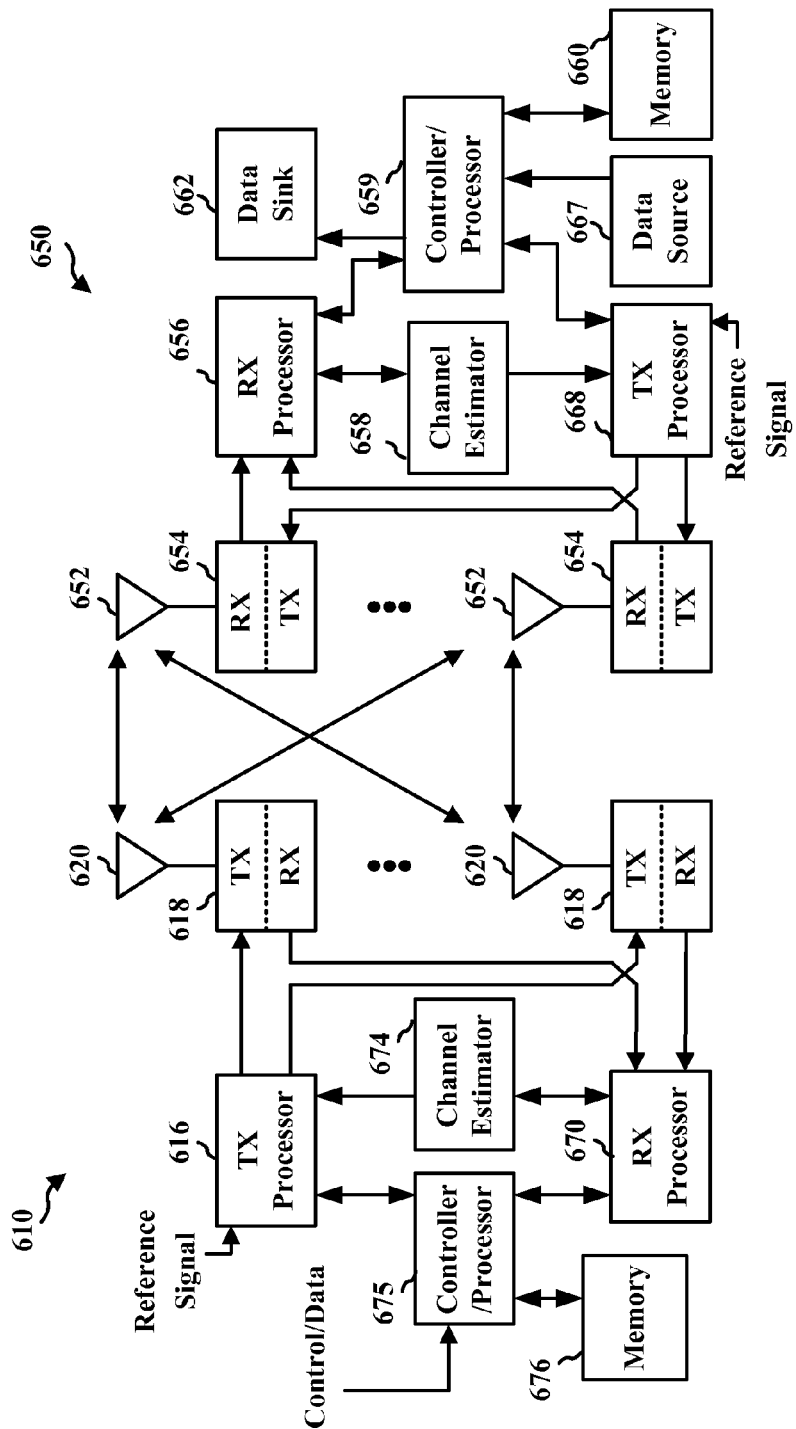
FIG. 6 is a diagram illustrating an example of an evolved Node B (eNB) and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

A radio access technology (RAT) refers to, among other features, the underlying physical connection method for a radio based communication network. RATs may include a 2.5 generation (2.5 G) RAT, a third generation (3G) RAT, and a fourth generation (4G/LTE) RAT. RAT evolves from generation to generation. Evolution happens in terms of better voice qualities and faster data transfer rates.

A cellular network operator may charge its customer different rates (fees) based on the different RATs used by the customer for data communication. For example, the network operator may charge a higher fee for data transferred using a higher RAT (e.g., 4G) than a fee charged for transferring the same amount of data using a lower RAT (e.g., 3G).

In one configuration, the modem or the cellular network interface of a UE may be configured to always use the best (highest) RAT available. The best (highest) RAT available may provide a faster data rate. Thus, all applications running on a UE may automatically use the highest RAT available, as the modem or the cellular network interface is configured in such a manner. Many low priority applications or applications having lower quality of service (QoS) requirements such as email programs or news feed programs may not need to use the highest RAT available (e.g., 4G). Nonetheless, those applications use the highest RAT connections available for data transfer and are charged at a higher rate (fee). Therefore, there is a need to improve the techniques of providing cellular network connections to applications on a UE.

Accordingly, in another configuration, UEs can configure a RAT preference for each application. The UE can provide a cellular network connection to an application based on the preferred RAT of the application. In other words, each application may have a preferred RAT and may try to transfer data over the preferred RAT as much as possible. If a user requests an application to refresh or download data immediately while a cellular network connection using the preferred RAT of that application is not available, that application can use the currently available RAT to transfer data.

If a lower priority application that prefers a lower RAT attempts to transfer data while the UE is using a higher RAT connection, the UE may suspend or delay the data connection of the low priority application for a predetermined time period.

When a low priority application that prefers a lower RAT is running on a UE and the UE has chosen to use the lower RAT preferred by the low priority application, if an application having a higher QoS requirement is initiated, the UE may suspend the data connection of the low priority application and switch to using a higher RAT connection preferred by the application requiring a higher QoS.

Figure 7:
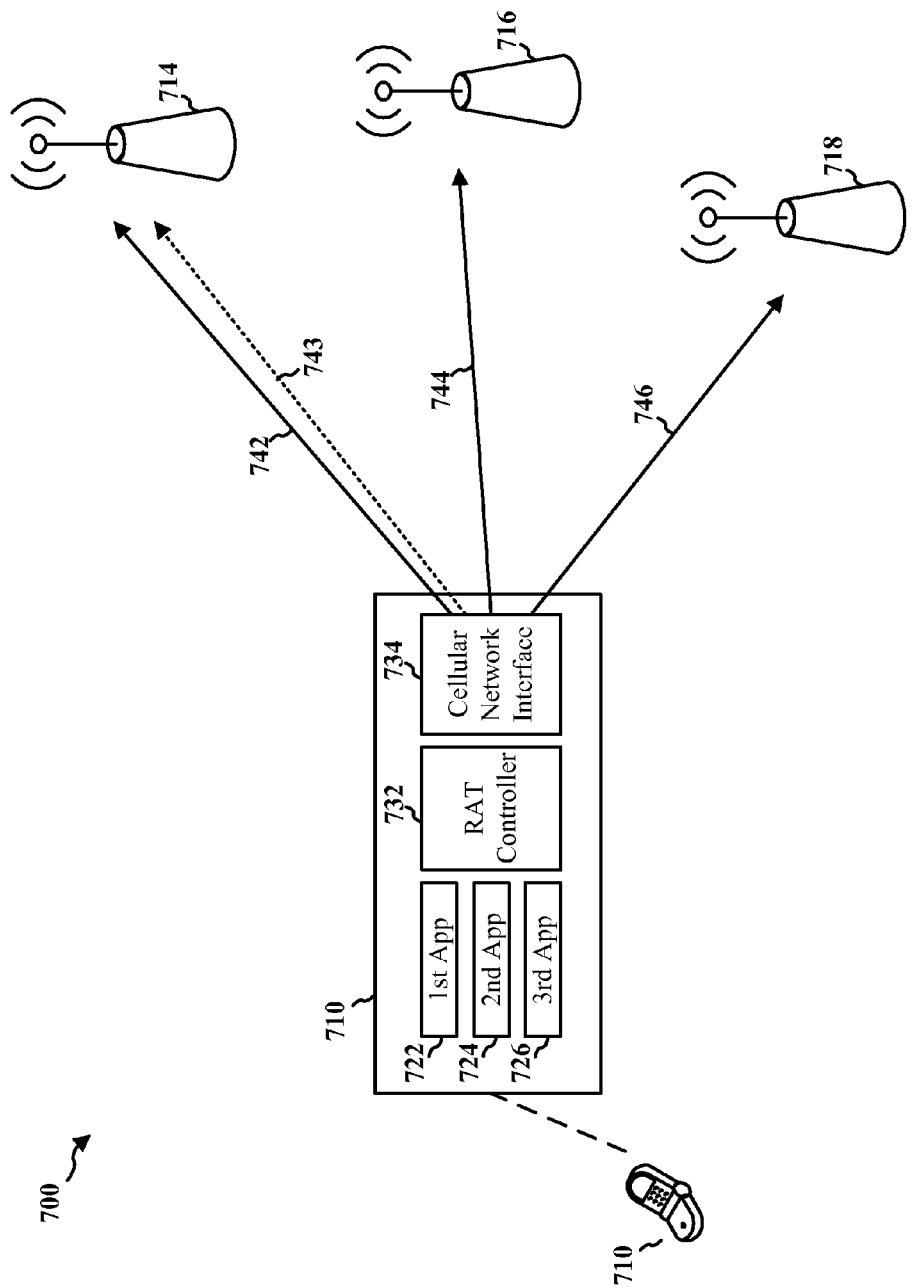
FIG. 7 is a diagram illustrating wireless communication between a UE and one or more eNBs.

FIG. 7 is a diagram 700 illustrating wireless communication between a UE and one or more eNBs. A UE may communicate with one or more eNBs as the UE moves from location to location. As an illustrative example and for clarity, FIG. 7 shows that a UE 710 may communicate with one or more of an eNB 714, an eNB 716, and an eNB 718. The eNBs 714, 716, 718 may support different radio access technologies (RATs). For example, the eNB 714 may support a 4G (LTE) RAT; the eNB 716 may support a 3G RAT; the eNB 718 may support a 2.5G RAT. The UE 710 has a cellular network interface 734 that may communicate with the eNB 714 on a 4G carrier 742, that may communicate with the eNB 716 on a 3G carrier 744, and that may communicate with the eNB 718 on a 2.5G carrier 746. In certain configurations, an eNB may support more than one RATs. For example, the eNB 714 may support, in addition to a 4G RAT, a 3G RAT. Accordingly, the cellular network interface 734 may communicate with the eNB 714 on a 3G carrier 743.

Multiple applications may run on the UE 710. As an illustrative example and for clarity, FIG. 7 only shows a first application 722, a second application 724, and a third application 726 running on the UE 710. The applications 722, 724, 726 each require a network connection and have a preferred RAT. For example, the first application 722 may be a video program that requires a higher data rate RAT such as a 4G RAT. The second application 724 may be a news feed program that only need a slower data rate RAT such as a 3G RAT.

The UE 710 further has an RAT controller 732, which may allow or disallow a given application to access the cellular network interface 734 and to establish a cellular network connection with the eNB that is in communication with the cellular network interface 734. The RAT controller 732 may provide a user interface or a program interface that allows a user or a remote device to configure the preferred RAT of each of the applications 722, 724, 726 through one or more inputs. In certain embodiments, the RAT controller 732 can automatically assign the preferred RAT of an application if the preferred RAT has not been configured. For example, the RAT controller 732 may assign the preferred RAT based on a category of an application. Applications in a video (or multimedia) category may be assigned a higher RAT (e.g., the 4G RAT) as the preferred RAT. Applications in an email/message/news feed category may be assigned a lower RAT (e.g., the 3G RAT) as the preferred RAT.

Figure 8:
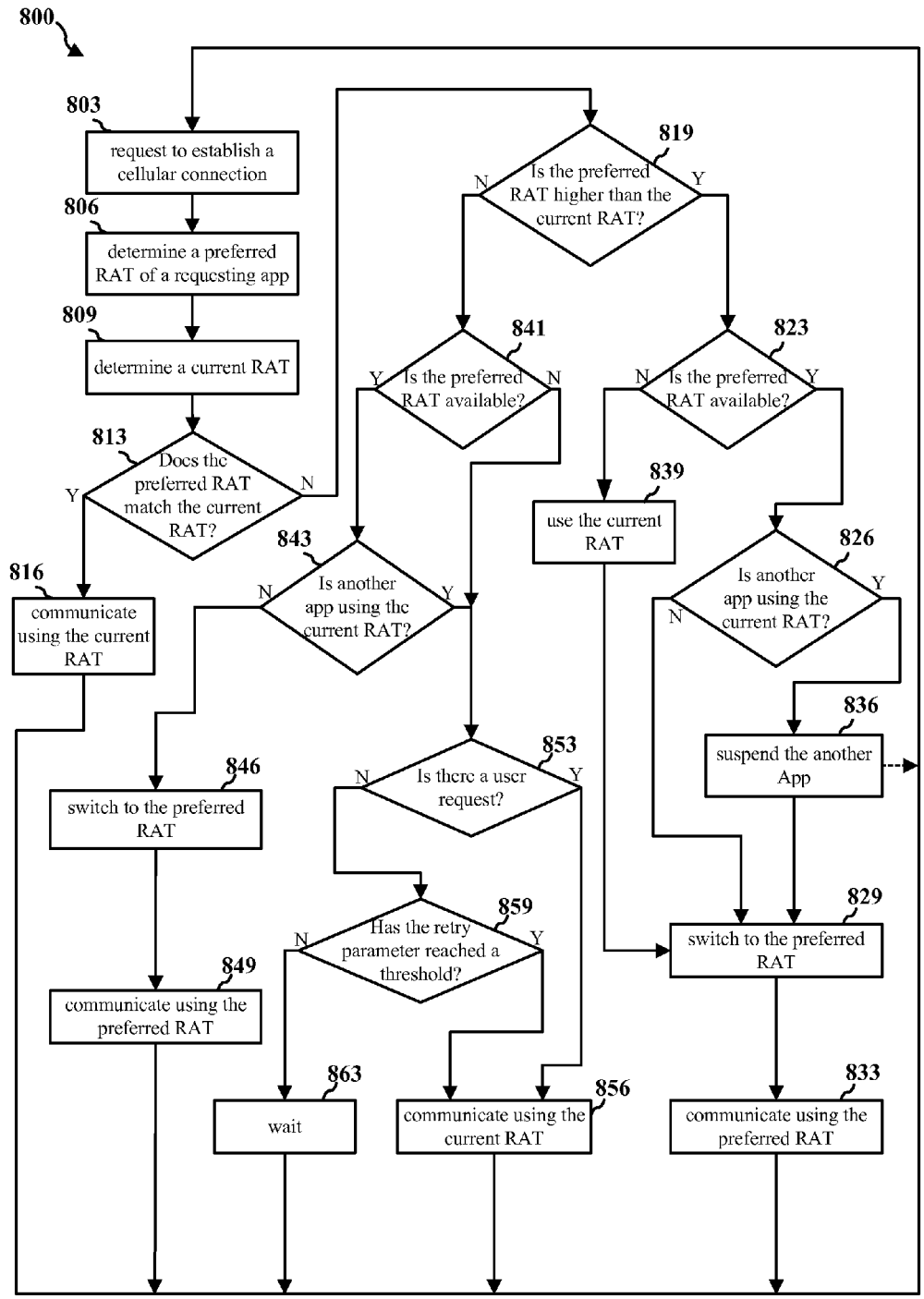
FIG. 8 is a flow chart illustrating procedures for providing cellular network connections to applications on a UE.

FIG. 8 is a diagram 800 illustrating procedures for providing cellular network connections to applications on a UE. Although the description infra is directed to applications preferring the 4G RAT or the 3G RAT, the techniques discussed can be similarly applied to any applications preferring two or more different RATs (e.g., 2G/3G). At operation 803, a requesting application may request the RAT controller 732 to grant access to the cellular network interface 734 in order to establish a cellular network connection. At operation 806, the RAT controller 732 determines the preferred RAT of the requesting application. For example, the requesting application may be the first application 722, which in this example may be a video streaming application and has a preferred RAT of 4G. Accordingly, the RAT controller 732 determines that the preferred RAT of the first application 722 is 4G. The cellular network interface 734 may have established a communication with one of the eNBs 714, 716, 718 using a supported RAT. At operation 809, the RAT controller 732 determines the current RAT used by the cellular network interface 734. In one example, the UE 710 is in the serving area of the eNB 714 and, thus, may be using the 4G carrier 742. Accordingly, the RAT controller 732 determines that the currently used RAT is 4G. In another example, the UE 710 is in the serving area of the eNB 716 and, thus, may be using the 3G carrier 744. Accordingly, the RAT controller 732 determines that the currently used RAT is 3G. In some circumstances, the UE 710 may be in the serving areas of both the eNB 714 and the eNB 716. The cellular network interface 734 may choose to use one of the 4G carrier 742 and the 3G carrier 744, for example, as directed by the RAT controller 732.

At operation 813, the RAT controller 732 determines whether the preferred RAT of the requesting application matches the RAT currently used by the cellular network interface 734. In one example, the cellular network interface 734 may be using the 4G carrier 742 and, accordingly, the RAT currently used by the cellular network interface 734 is 4G. When the requesting application is the first application 722, the RAT controller 732 determines that the preferred RAT of first application 722 matches the RAT currently used by the cellular network interface 734. Subsequently, at operation 816, the RAT controller 732 allows the first application 722 to access the cellular network interface 734 to establish a cellular network connection on the 4G carrier 742. Then the procedure returns to operation 803.

During operation 813, in another example, the RAT controller 732 may determine that the preferred RAT of the requesting application does not match the RAT currently used by the cellular network interface 734. At operation 819, the RAT controller 732 determines whether the preferred RAT of the requesting application is higher than the RAT currently used by the cellular network interface 734. In this example, the requesting application may be the first application 722. The cellular network interface 734 may use the 3G carrier 744 and, accordingly, the RAT currently used by the cellular network interface 734 is 3G. Therefore, the RAT controller 732 determines that the preferred RAT is higher than the RAT currently used by the cellular network interface 734. Subsequently, the procedure enters operation 823, at which the RAT controller 732 determines whether the preferred RAT of the requesting application (i.e., the first application 722 in this example) is available to the cellular network interface 734.

During operation 823, the RAT controller 732 may determine that the preferred RAT of the requesting application is available. For example, although currently the cellular network interface 734 may choose to use the 3G carrier 744, the UE 710 may also be in the serving area of the eNB 714 as well and, therefore, may switch to using the 4G carrier 742. Subsequently at operation 826, the RAT controller 732 determines whether another application is using a cellular network connection established on the RAT currently used by the cellular network interface 734 (i.e., 3G in this example), and the RAT currently used by the cellular network interface 734 is the preferred RAT of the another application. In circumstances there may not be such an application. Thus, the RAT controller 732 may determine that there is no such an application and enters operation 829. At operation 829, the RAT controller 732 instructs the cellular network interface 734 to switch to using the preferred RAT of the requesting application. In this example, the requesting application is the first application 722. Therefore, the RAT controller 732 instructs the cellular network interface 734 to switch to using the 4G RAT. Accordingly, the cellular network interface 734 may detach from the 3G carrier 744, and may establish a communication channel with the eNB 714 and attach to the 4G carrier 742. Then, at operation 833, the RAT controller 732 grants the requesting application (i.e., the first application 722 in this example) access to the cellular network interface 734 for a predetermined time period. The requesting application may obtain a cellular network connection from the cellular network interface 734 established on a carrier of the preferred RAT of the requesting application. The requesting application may then communicate data with the eNBs 714, 716, 718 on the carrier. In this example, the first application 722 may communicate data with the eNB 714 on the 4G carrier 742.

Referring back to operation 826, during which the RAT controller 732 may detect that one or more other applications are using a cellular network connection established on the RAT currently used by the cellular network interface 734. For example, the requesting application may be the first application 722 and the RAT controller 732 may determine that the second application 724 is using a cellular network connection established on the 3G RAT. In this example, the second application 724 may be a news feed program and the preferred RAT of the second application 724 may be the 3G RAT. The cellular network interface 734 may have decided to use the 3G carrier 744 and may be providing the second application 724 a 3G cellular network connection on the 3G carrier 744. Subsequently, at operation 836, the RAT controller 732 may suspend the cellular network connection provided to the second application 724 (i.e., the another application that is using a cellular network connection established on the RAT currently used by the cellular network interface 734). In other words, the RAT controller 732 may disallow the second application 724 to access the cellular network interface 734 and to obtain a cellular network connection. The second application 724 may start another procedure at operation 803. In the another procedure, the second application 724 is the requesting application and requests the RAT controller 732 grant the second application 724 an access to the cellular network interface 734. The another procedure will be further described infra. Subsequently, the current procedure enters operation 829 described supra.

Referring back to operation 823, at which the RAT controller 732 may determine that the preferred RAT of the requesting application is not available. In this example, the requesting application is the first application 722 and the preferred RAT is the 4G RAT. The RAT currently used by the cellular network interface 734 is the 3G RAT. The cellular network interface 734 may only have a cellular network connection with the eNB 716 on the 3G carrier 744. Subsequently, at operation 839, the RAT controller 732 grants the requesting application access to the cellular network interface 734. The requesting application may obtain a cellular network connection from the cellular network interface 734 established on the RAT currently used by the cellular network interface 734 that is not the preferred RAT of the requesting application. In this example, the first application 722 uses a 3G cellular network connection provided by the cellular network interface 734 on the 3G carrier 744. After a predetermined time period, the requesting application may enter operation 803 again and may request a cellular network connection. Using a similar procedure as described supra, the RAT controller 732 may instruct the cellular network interface 734 to establish a cellular network connection at the preferred RAT of the requesting application if such a cellular network connection is available.

Referring back to operation 836, at which the RAT controller 732 may suspend the cellular network connection provided to the second application 724. Subsequently, after a predetermined time period, in another procedure, the second application 724 then enters operation 803 of the second procedure. In the another procedure, at operation 803, the second application 724 is the requesting application. In this example, the second application 724 may request the RAT controller 732 to grant access to the cellular network interface 734 in order to establish a cellular network connection. At operation 806, the RAT controller 732 determines the preferred RAT of the second application 724, which is the 3G RAT. At operation 809, the RAT controller 732 determines the current RAT used by the cellular network interface 734. As described supra, the RAT currently used by the cellular network interface 734 is the 4G RAT (selected at operation 829 in the previous procedure). At operation 813, the RAT controller 732 determines whether the preferred RAT of the second application 724 matches the RAT currently used by the cellular network interface 734. If preferred RAT of the second application 724 matches the RAT currently used by the cellular network interface 734, at operation 816, the RAT controller 732 allows the second application 724 to access the cellular network interface 734 to establish a cellular network connection on the carrier currently used. Then the procedure returns to operation 803. If preferred RAT of the second application 724 does not match the RAT currently used by the cellular network interface 734, for example when the RAT currently used by the cellular network interface 734 is 4G, then at operation 819 the RAT controller 732 determines that the preferred RAT (i.e., 3G) of the second application 724 is not higher than the RAT currently used by the cellular network interface 734 (i.e., 4G).

Subsequently, at operation 841, the RAT controller 732 determines whether the preferred RAT of the requesting application (i.e., the second application 724 in this example) is available to the cellular network interface 734. The RAT controller 732 may determine that the preferred RAT of the second application 724 is available. For example, although currently the cellular network interface 734 may choose to use the 4G carrier 742, the UE 710 may also be in the serving area of the eNB 716, as well, and may use the 3G carrier 744.

At operation 843, the RAT controller 732 determines whether another application is using the currently established cellular network connection. In this example, the RAT controller 732 determines whether any application is using a cellular network connection established on the 4G RAT. The first application 722, which was using the cellular network connection established on the 4G RAT, may have been terminated and may not use the cellular network connection anymore. Therefore, the RAT controller 732 may determine that no application is using the cellular network connection of the 4G RAT. Accordingly, at operation 846, the RAT controller 732 instructs the cellular network interface 734 to switch to the preferred RAT of the requesting application. In this example, the RAT controller 732 instructs the cellular network interface 734 to switch to using the 3G RAT. The cellular network interface 734 may detach from the 4G carrier 742, and may establish a communication channel with the eNB 716 and attach to the 3G carrier 744. At operation 849, the RAT controller 732 grants the requesting application (i.e., the second application 724 in this example) access to the cellular network interface 734 for a predetermined time period. The requesting application may obtain a cellular network connection from the cellular network interface 734 established on a carrier of the preferred RAT of the requesting application. The requesting application may then communicate data with the eNBs 714, 716, 718 on the carrier. In this example, the second application 724 may communicate data with the eNB 716 on the 3G carrier 744. After a predetermined time period, the requesting application may enter operation 803.

Referring back to operation 841, the RAT controller 732 may determine that the preferred RAT of the second application 724 is not available. In this example, the RAT controller 732 may determine that only the 4G RAT is available for the second application 724 (whose preferred RAT is the 3G RAT). Accordingly, the procedure enters operation 853.

Referring back to operation 843, the RAT controller 732 may determine that another application is using a cellular network connection established on the RAT currently used by the cellular network interface 734. In this example, the RAT controller 732 may determine that the first application 722 is still using the cellular network connection established on the 4G RAT. Accordingly, the procedure enters operation 853.

At operation 853, the RAT controller 732 determines whether there is an immediate user request for the requesting application to access the cellular network. For example, the second application 724 may provide a user interface to a user. Through the user interface, the user can request an immediate access to a news feed server through the cellular network. If the RAT controller 732 determines that there is an immediate user request, the procedure enters operation 856. If the RAT controller 732 determines that there is not an immediate user request, at operation 859, the RAT controller 732 may determine whether a retry parameter configured for the requesting application has reached a predetermined threshold. In one configuration, the retry parameter may be the number of times that the requesting application has consecutively requested the RAT controller 732 to grant a cellular network connection established on the preferred RAT of the requesting application but was not able to obtain such a cellular network connection. In this example, each time the procedure enters operation 859 for the second application 724, the RAT controller 732 can add one to a retry counter configured for the second application 724. The RAT controller 732 then determines whether the retry counter has reached a predetermined number (e.g., 10 times). In another configuration, the retry parameter may be a time period for which the cellular network connection of the requesting application has been suspended. In this example, the first time the procedure enters operation 859 for the second application 724, the RAT controller 732 may store a timestamp for the second application 724. Subsequently, each time at operation 859 the RAT controller 732 may compare the current time with the timestamp stored at the first time to determine whether the suspension time period has reached a predetermined threshold (e.g., 5 minutes).

Upon determining that the retry parameter has not reached the predetermined threshold, at operation 863, the RAT controller 732 disallows providing, or suspends providing, a cellular network connection to the requesting application (e.g., the second application 724). The requesting application then waits for a predetermined time period. After the predetermined time period, the requesting application may enter operation 803 again and may request a cellular network connection. Each time the procedure determines that the preferred RAT of the requesting application matches the RAT currently used by the cellular network interface 734 and enters operation 816, the RAT controller 732 may reset the retry parameter (e.g., the retry counter and the retry timestamp) of the requesting application (e.g., the second application 724). Upon determining that the retry parameter has reached the predetermined threshold, the procedure enters operation 856.

At operation 856, the RAT controller 732 grants the requesting application access to the cellular network interface 734. The requesting application may obtain a cellular network connection from the cellular network interface 734 established on a RAT higher than the preferred RAT of the requesting application. The requesting application may communicate data with the eNBs 714, 716, 718 on the cellular network connection. In this example, the second application 724 uses a 4G cellular network connection provided by the cellular network interface 734 on the 4G carrier 742. After a predetermined time period, the requesting application may enter operation 803 again and may request a cellular network connection. Using a similar procedure as described supra, the RAT controller 732 may instruct the cellular network interface 734 to establish a cellular network connection at the preferred RAT of the requesting application when such a cellular network connection is available.

Figure 9:
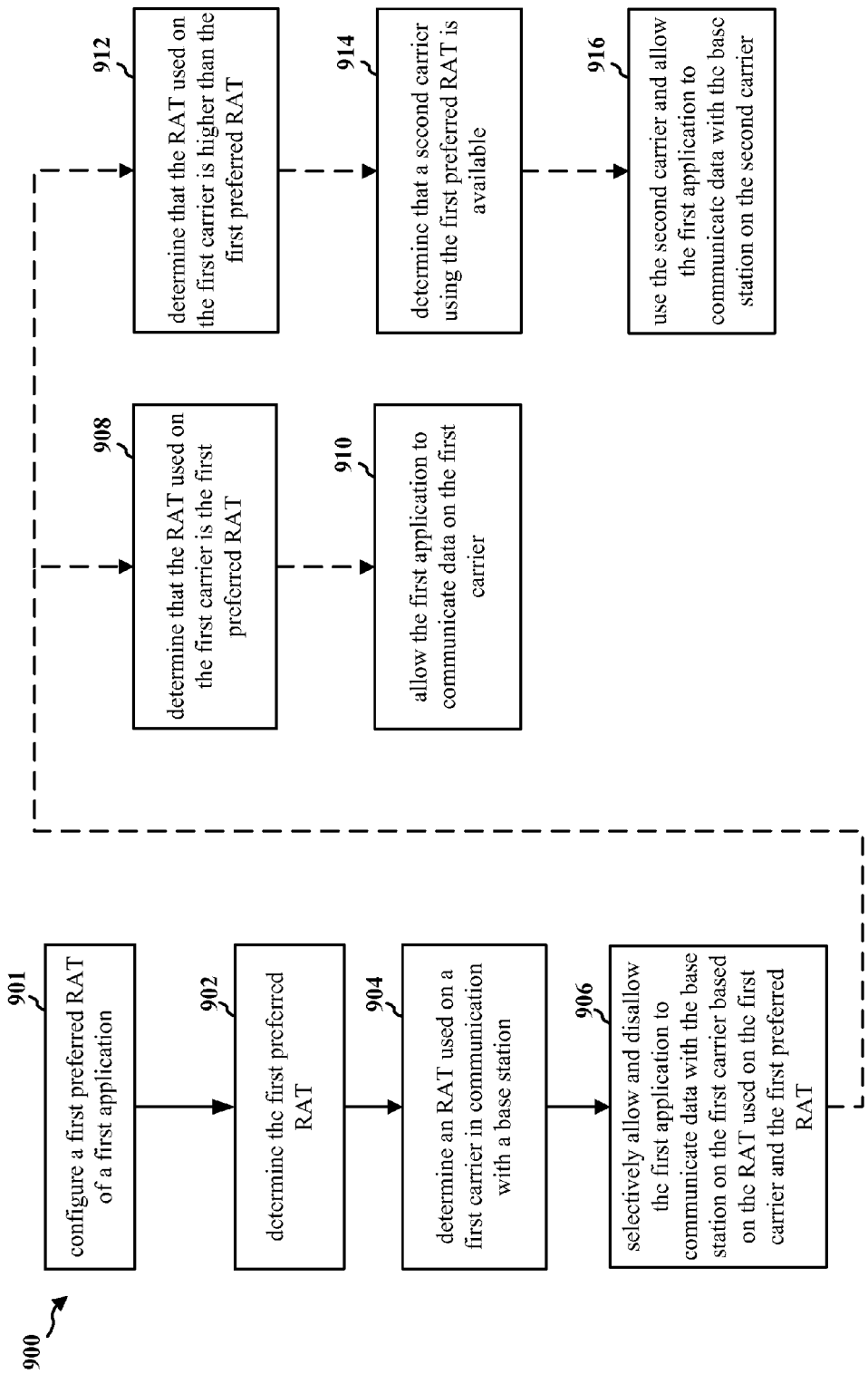
FIG. 9 is a flow chart illustrating a procedure for providing a cellular network connection to an application based on a preferred RAT of the application.

FIG. 9 is a flow chart 900 illustrating a procedure for providing a cellular network connection to an application based on a preferred RAT of the application. The procedure may be performed by a UE (e.g., the UE 710, the apparatus 1102/1102'). The UE communicates with one or more base stations. For example, referring to FIG. 7, the UE 710 communicates with the eNBs 714, 716, 718. At operation 901, the UE may configure the first preferred RAT of a first application. For example, referring to FIG. 7, the RAT controller 732 may provide a user interface or a program interface that allows a user or a remote device to configure the preferred RAT of each of the applications 722, 724, 726 through one or more inputs. At operation 902, the UE determines the first preferred RAT. For example, referring to FIG. 8, at operation 806, the RAT controller 732 determines the preferred RAT of the requesting application. The requesting application may be the first application 722, which may be a video streaming application and has a preferred RAT of 4G. Accordingly, the RAT controller 732 determines that the preferred RAT of the first application 722 is 4G. At operation 904, the UE determines an RAT used on a first carrier in communication with the one or more base stations. For example, referring to FIG. 8, at operation 809, the UE 710 is in the serving area of the eNB 714 and, thus, may be using the 4G carrier 742. Accordingly, the RAT controller 732 determines that the currently used RAT is 4G. At operation 906, the UE selectively allows and disallows the first application to communicate data with the one or more base stations on the first carrier based on the RAT used on the first carrier and the first preferred RAT. For example, referring to FIG. 8, at operation 816, the RAT controller 732 allows the first application 722 to access the cellular network interface 734 to establish a cellular network connection on the 4G carrier 742. At operation 863, the RAT controller 732 disallows providing, or suspends providing, a cellular network connection to the requesting application the second application 724.

In one configuration, within operation 906, the UE, at operation 908, further determines that the RAT used on the first carrier is the first preferred RAT. For example, referring to FIG. 8, at operation 813, the RAT controller 732 determines whether the preferred RAT of the requesting application matches the RAT currently used by the cellular network interface 734. The cellular network interface 734 may be using the 4G carrier 742 and, accordingly, the RAT currently used by the cellular network interface 734 is 4G. The RAT controller 732 determines that the preferred RAT of first application 722 matches the RAT currently used by the cellular network interface 734. Subsequently, at operation 910, the UE in response allows the first application to communicate data on the first carrier. For example, referring to FIG. 8, at operation 816, the RAT controller 732 allows the first application 722 to access the cellular network interface 734 to establish a cellular network connection on the 4G carrier 742.

In one configuration, within operation 906, the UE, at operation 912, further determines that the RAT used on the first carrier is higher than the first preferred RAT. For example, referring to FIG. 8, at operation 819, the RAT controller 732 determines that the preferred RAT (i.e., 3G) of the second application 724 is not higher than the RAT currently used by the cellular network interface 734 (i.e., 4G). Subsequently, at operation 914, the UE determines that a second carrier using the first preferred RAT is available. For example, referring to FIG. 8, at operation 841, the RAT controller 732 determines whether the preferred RAT of the requesting application (i.e., the second application 724 in this example) is available to the cellular network interface 734. The RAT controller 732 may determine that the preferred RAT of the second application 724 is available. At operation 916, the UE in response uses the second carrier and allows the first application to communicate data with the one or more base stations on the second carrier. For example, referring to FIG. 8, at operation 846, the RAT controller 732 instructs the cellular network interface 734 to switch to using the 3G RAT. The cellular network interface 734 may detach from the 4G carrier 742, and may establish a communication channel with the eNB 716 and attach to the 3G carrier 744. The second application 724 may communicate data with the eNB 716 on the 3G carrier 744.

Figure 10:
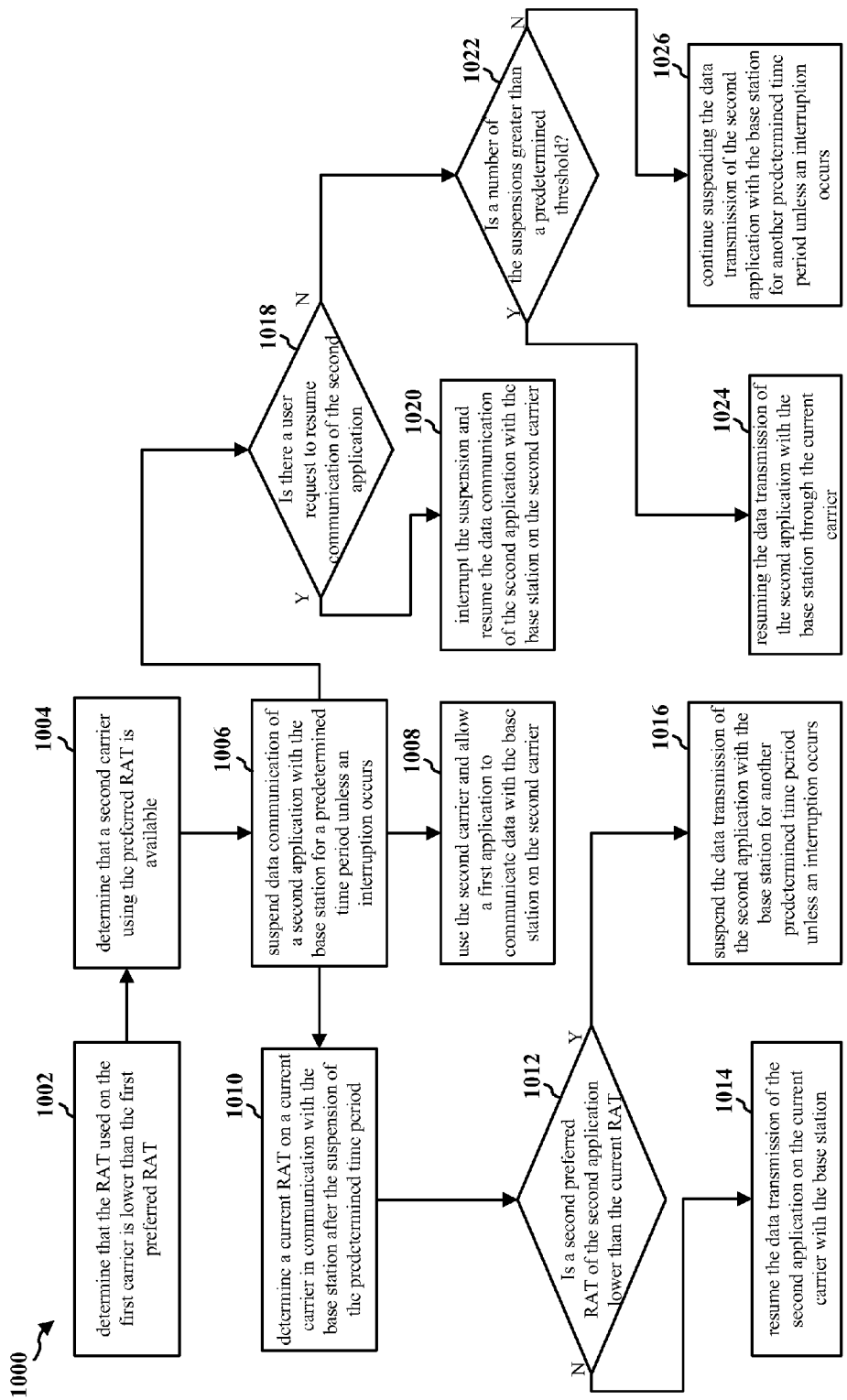
FIG. 10 is a flow chart illustrating another procedure for providing a cellular network connection to an application based on a preferred RAT of the application.

FIG. 10 is a flow chart 1000 illustrating another procedure for providing a cellular network connection to an application based on a preferred RAT of the application. The procedure may be performed by a UE (e.g., the UE 710, the apparatus 1102/1102'). This procedure may be performed within operation 906 illustrated in FIG. 9. At operation 1002, the UE may determine that the RAT used on the first carrier is lower than the first preferred RAT. For example, referring to FIG. 8, at operation 819, the RAT controller 732 determines that the preferred RAT is higher than the RAT currently used by the cellular network interface 734. At operation 1004, the UE determines that a second carrier is available. A second carrier is in communication with the one or more base stations using the first preferred RAT. For example, referring to FIG. 8, at operation 823, although currently the cellular network interface 734 may choose to use the 3G carrier 744, the UE 710 may also be in the serving area of the eNB 714 as well and, therefore, may switch to using the 4G carrier 742.

At operation 1006, the UE may suspend data communication of a second application with the one or more base stations for a predetermined time period unless an interruption occurs. The second preferred RAT of the second application is lower than an RAT used on the second carrier. For example, referring to FIG. 8, at operation 836, the RAT controller 732 may suspend the cellular network connection provided to the second application 724. At operation 1008, the UE in response may use the second carrier and may allow the first application to communicate data with the one or more base stations on the second carrier. For example, referring to FIG. 8, at operation 829, the RAT controller 732 instructs the cellular network interface 734 to switch to using the 4G RAT. Accordingly, the cellular network interface 734 may detach from the 3G carrier 744, and may establish a communication channel with the eNB 714 and attach to the 4G carrier 742. Then, at operation 833, the first application 722 may communicate data with the eNB 714 on the 4G carrier 742.

In one configuration, subsequent to operation 1006, the UE may determine, at operation 1010, a current RAT on a current carrier in communication with the one or more base stations after the predetermined time period. For example, referring to FIG. 8, at operation 803, the second application 724 may request the RAT controller 732 to grant access to the cellular network interface 734 in order to establish a cellular network connection. At operation 809, the RAT controller 732 determines the current RAT used by the cellular network interface 734. At operation 1012, the UE may determine whether the second preferred RAT is lower than the current RAT. For example, referring to FIG. 8, at operation 813, the RAT controller 732 determines whether the preferred RAT of the second application 724 matches the RAT currently used by the cellular network interface 734. At operation 819, the RAT controller 732 determines whether the preferred RAT (i.e., 3G) of the second application 724 is higher than the RAT currently used by the cellular network interface 734 (i.e., 4G).

In response to determining that the second preferred RAT is not lower than the current RAT, at operation 1014, the UE may resume the data communication of the second application on the current carrier with the one or more base stations. For example, referring to FIG. 8, at operation 813, the RAT controller 732 determines whether the preferred RAT of the second application 724 matches the RAT currently used by the cellular network interface 734. If preferred RAT of the second application 724 matches the RAT currently used by the cellular network interface 734, at operation 816, the RAT controller 732 allows the second application 724 to access the cellular network interface 734 to establish a cellular network connection on the carrier currently used.

In response to determining that the second preferred RAT is lower than the current RAT, at operation 1016, the UE may suspend the data communication of the second application with the one or more base stations for another predetermined time period unless an interruption occurs. For example, referring to FIG. 8, at operation 863, the RAT controller 732 disallows providing, or suspends providing, a cellular network connection to the second application 724.

In one configuration, subsequent to operation 1006, the UE may determine whether there is a user request to resume communication of the second application. If there is such a user request, at operation 1020, the UE may interrupt the suspension in the predetermined time period and may resume the data communication of the second application with the one or more base stations on the second carrier. For example, referring to FIG. 8, at operation 853, the second application 724 may provide a user interface to a user. Through the user interface, the user can request an immediate access to a news feed server through the cellular network. The RAT controller 732 determines whether there is an immediate user request.

If there is not a user request to resume communication of the second application, at operation 1022, the UE may determine whether a number of the suspensions is greater than a predetermined threshold. For example, referring to FIG. 8, each time the procedure enters operation 859 for the second application 724, the RAT controller 732 can add one to a retry counter configured for the second application 724. The RAT controller 732 then determines whether the retry counter has reached a predetermined number (e.g., 10 times).

If the number of the suspensions is greater than a predetermined threshold, at operation 1024, the UE may resume the data communication of the second application with the one or more base stations through the current carrier. For example, referring to FIG. 8, at operation 856, the RAT controller 732 grants the requesting application access to the cellular network interface 734. The requesting application may obtain a cellular network connection from the cellular network interface 734 established on a RAT higher than the preferred RAT of the requesting application. The requesting application may communicate data with the eNBs 714, 716, 718 on the cellular network connection.

If the number of the suspensions is not greater than a predetermined threshold, at operation 1026, the UE may suspend the data communication of the second application with the one or more base stations for another predetermined time period unless an interruption occurs. For example, referring to FIG. 8, at operation 863, the RAT controller 732 disallows providing, or suspends providing, a cellular network connection to the requesting application (e.g., the second application 724).

Figure 11:
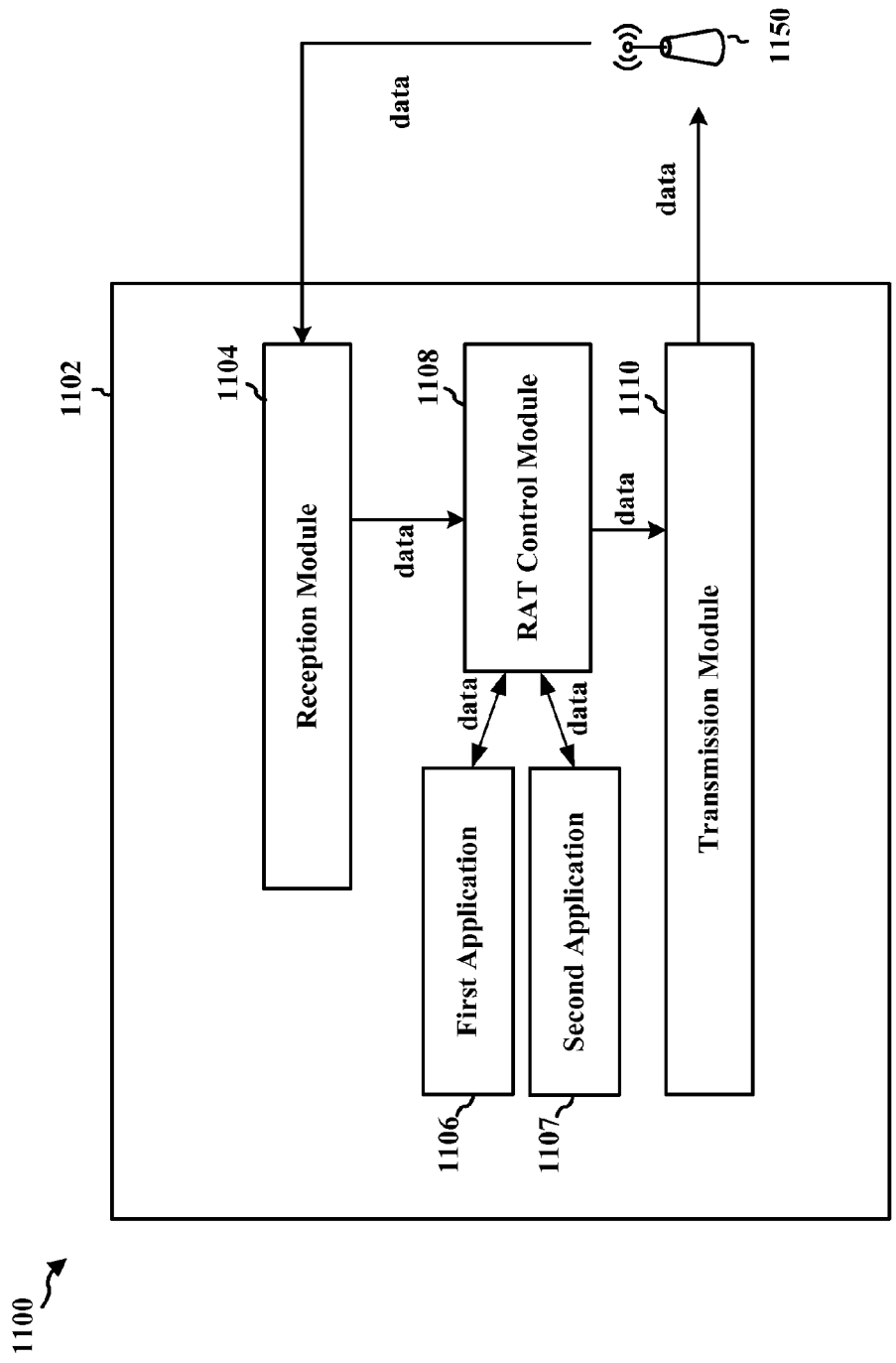
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus 1102 may include a reception module 1104, a first application 1106, a second application 1107, a RAT control module 1108, and a transmission module 1110. The reception module 1104 and the transmission module 1110 may include the cellular network interface 734. The RAT control module 1108 may correspond to the RAT controller 732.

The apparatus 1102 communicates with one or more base stations 1150. The RAT control module 1108 may be configured to determine a first preferred RAT the first application 1106. The RAT control module 1108 may be configured to determine an RAT used on a first carrier in communication with the one or more base stations 1150. The RAT control module 1108 may be configured to selectively allow and disallow the first application 1106 to communicate data with the base station on the first carrier based on the RAT used on the first carrier and the first preferred RAT.

In one configuration, the RAT control module 1108 may be configured to execute a first determination that the RAT used on the first carrier is lower than the first preferred RAT. The RAT control module 1108 may be configured to execute a second determination that a second carrier is available. The second carrier is in communication with the one or more base stations 1150 using the first preferred RAT. The RAT control module 1108, the reception module 1104, and/or the transmission module 1110 may be configured to use, in response to the first determination and the second determination, the second carrier and allow the first application 1106 to communicate data with the one or more base stations 1150 on the second carrier.

The RAT control module 1108, the reception module 1104, and/or the transmission module 1110 may be configured to suspend data communication of the second application 1107 with the one or more base stations 1150 for a predetermined time period unless an interruption occurs. A second preferred RAT of the second application 1107 is lower than an RAT used on the second carrier. The RAT control module 1108 may be configured to interrupt, in response to a request, the suspension in the predetermined time period. The RAT control module 1108, the reception module 1104, and/or the transmission module 1110 may be configured to resume the data communication of the second application 1107 with the one or more base stations 1150 on the second carrier.

The RAT control module 1108 may be configured to determine a current RAT on a current carrier in communication with the one or more base stations 1150 after the predetermined time period. The RAT control module 1108 may be configured to determine whether the second preferred RAT is lower than the current RAT. The RAT control module 1108, the reception module 1104, and/or the transmission module 1110 may be configured to resume, in response to determining that the second preferred RAT is not lower than the current RAT, the data communication of the second application 1107 on the current carrier with the one or more base stations 1150. The RAT control module 1108, the reception module 1104, and/or the transmission module 1110 may be configured to suspend, in response to determining that the second preferred RAT is lower than the current RAT, the data communication of the second application 1107 with the one or more base stations 1150 for another predetermined time period unless an interruption occurs.

The RAT control module 1108 may be configured to determine that a number of the suspensions is greater than a predetermined threshold. The RAT control module 1108, the reception module 1104, and/or the transmission module 1110 may be configured to resume the data communication of the second application 1107 with the one or more base stations 1150 through the current carrier in response to determining that the number of the suspensions is greater than the predetermined threshold.

In one configuration, the RAT control module 1108 may be configured to determine that the RAT used on the first carrier is the first preferred RAT. The RAT control module 1108, the reception module 1104, and/or the transmission module 1110 may be configured to allow, in response to determining that the RAT used on the first carrier is the first preferred RAT, the first application 1106 to communicate data on the first carrier.

In one configuration, the RAT control module 1108 may be configured to execute a first determination that the RAT used on the first carrier is higher than the first preferred RAT. The RAT control module 1108 may be configured to execute a second determination that a second carrier using the first preferred RAT is available. The RAT control module 1108, the reception module 1104, and/or the transmission module 1110 may be configured to use, in response to the first determination and the second determination, the second carrier and to allow the first application 1106 to communicate data with the one or more base stations 1150 on the second carrier. The RAT control module 1108 may be configured to configure the first preferred RAT.

The apparatus may include additional modules that perform each of the blocks of the algorithm in the aforementioned flow charts of FIGS. 9-10. As such, each block in the aforementioned flow charts of FIGS. 9-10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
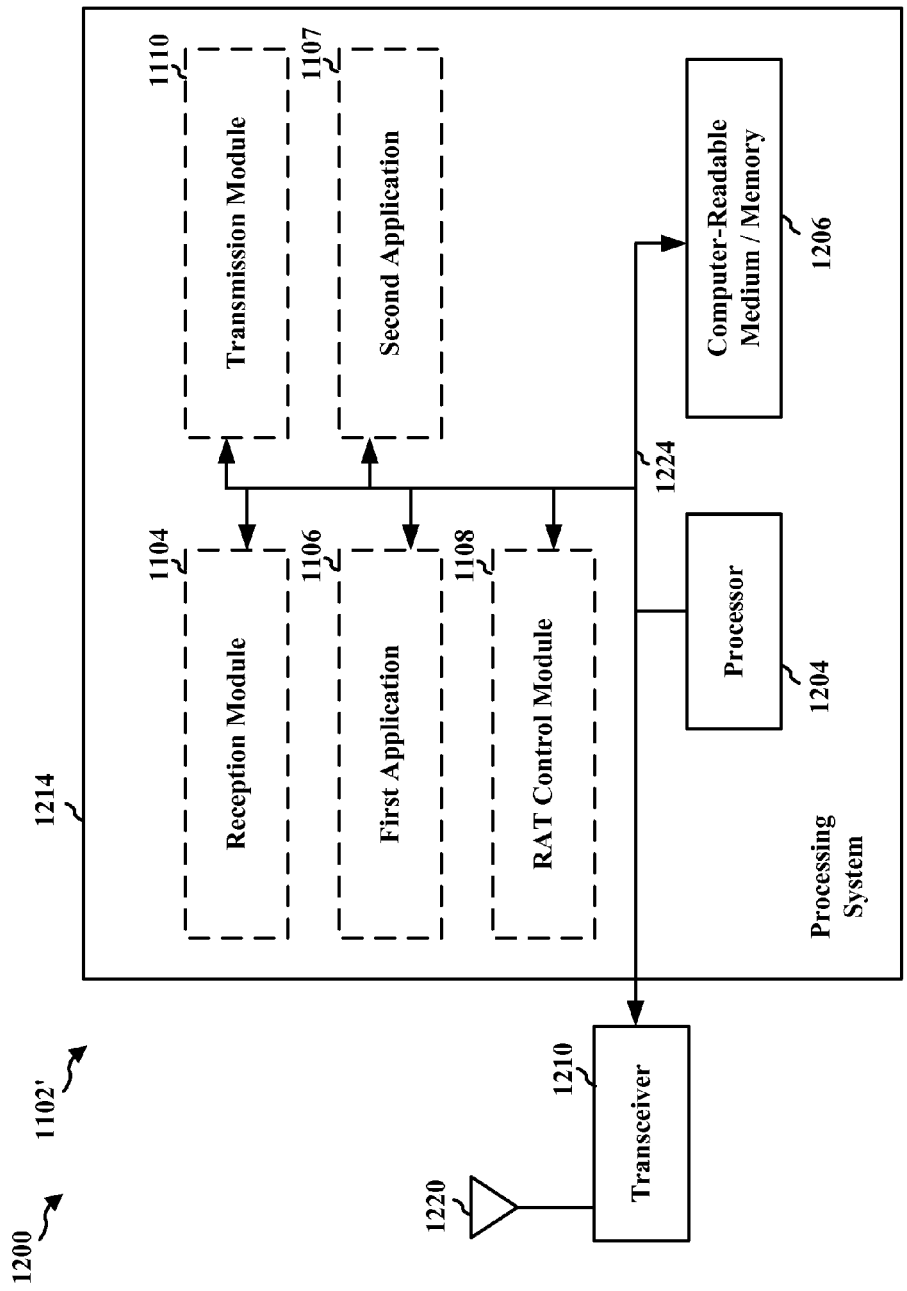
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1107, 1108, 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception module 1104. In addition, the transceiver 1210 receives information from the processing system 1214, specifically the transmission module 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1107, 1108, 1110. The modules may be software modules running in the processor 1204, resident/stored in the computer readable medium/memory 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for determining a first preferred RAT of a first application. The apparatus 1102/1102' for wireless communication includes means for determining an RAT used on a first carrier in communication with the one or more base stations. The apparatus 1102/1102' for wireless communication includes means for selectively allowing and disallowing the first application to communicate data with the one or more base stations on the first carrier based on the RAT used on the first carrier and the first preferred RAT.

In one configuration, the apparatus 1102/1102' for wireless communication may include means for executing a first determination that the RAT used on the first carrier is lower than the first preferred RAT. The apparatus 1102/1102' for wireless communication may include means for executing a second determination that a second carrier is available. The second carrier is in communication with the one or more base stations using the first preferred RAT. The apparatus 1102/1102' for wireless communication may include means for using, in response to the first determination and the second determination, the second carrier and allowing the first application to communicate data with the one or more base stations on the second carrier.

In one configuration, the apparatus 1102/1102' for wireless communication may include means for suspending data communication of a second application with the one or more base stations for a predetermined time period unless an interruption occurs. A second preferred RAT of the second application is lower than an RAT used on the second carrier.

In one configuration, the apparatus 1102/1102' for wireless communication may include means for interrupting, in response to a request, the suspension in the predetermined time period. The apparatus 1102/1102' for wireless communication may include means for resuming the data communication of the second application with the one or more base stations on the second carrier.

In one configuration, the apparatus 1102/1102' for wireless communication may include means for determining a current RAT on a current carrier in communication with the one or more base stations after the predetermined time period. The apparatus 1102/1102' for wireless communication may include means for determining whether the second preferred RAT is lower than the current RAT. The apparatus 1102/1102' for wireless communication may include means for resuming, in response to determining that the second preferred RAT is not lower than the current RAT, the data communication of the second application on the current carrier with the one or more base stations. The apparatus 1102/1102' for wireless communication may include means for suspending, in response to determining that the second preferred RAT is lower than the current RAT, the data communication of the second application with the one or more base stations for another predetermined time period unless an interruption occurs.

In one configuration, the apparatus 1102/1102' for wireless communication may include means for determining that a number of the suspensions is greater than a predetermined threshold. The apparatus 1102/1102' for wireless communication may include means for resuming the data communication of the second application with the one or more base stations through the current carrier in response to determining that the number of the suspensions is greater than the predetermined threshold.

In one configuration, the apparatus 1102/1102' for wireless communication may include means for determining that the RAT used on the first carrier is the first preferred RAT. The apparatus 1102/1102' for wireless communication may include means for allowing, in response to the determining that the RAT used on the first carrier is the first preferred RAT, the first application to communicate data on the first carrier.

In one configuration, the apparatus 1102/1102' for wireless communication may include means for executing a first determination that the RAT used on the first carrier is higher than the first preferred RAT. The apparatus 1102/1102' for wireless communication may include means for executing a second determination that a second carrier using the first preferred RAT is available. The apparatus 1102/1102' for wireless communication may include means for using, in response to the first determination and the second determination, the second carrier and allowing the first application to communicate data with the one or more base stations on the second carrier.

In one configuration, the apparatus 1102/1102' for wireless communication may include means for configuring the first preferred RAT. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of wireless communication of a user equipment (UE) communicating with one or more base stations, comprising:
    determining a first preferred radio access technology (RAT) of a first application;
    determining a RAT used on a first carrier in communication with the one or more base stations;
    selectively allowing and disallowing the first application to communicate data with the one or more base stations on the first carrier based on the RAT used on the first carrier and the first preferred RAT;
    executing a first determination that the RAT used on the first carrier is lower than the first preferred RAT;
    executing a second determination that a second carrier is available, wherein the second carrier is in communication with the one or more base stations using the first preferred RAT;
    using, in response to the first determination and the second determination, the second carrier and allowing the first application to communicate data with the one or more base stations on the second carrier; and
    suspending data communication of a second application with the one or more base stations for a predetermined time period unless an interruption occurs, wherein a second preferred RAT of the second application is lower than an RAT used on the second carrier.

2. The method of claim 1, further comprising:
    interrupting, in response to a request, the suspension in the predetermined time period; and
    resuming the data communication of the second application with the one or more base stations on the second carrier.

3. The method of claim 1, further comprising:
determining a current RAT on a current carrier in communication with the one or more base stations after the predetermined time period;
determining whether the second preferred RAT is lower than the current RAT;
resuming, in response to determining that the second preferred RAT is not lower than the current RAT, the data communication of the second application on the current carrier with the one or more base stations; and
suspending, in response to determining that the second preferred RAT is lower than the current RAT, the data communication of the second application with the one or more base stations for another predetermined time period unless an interruption occurs.

4. The method of claim 3, further comprising:
determining that a number of the suspensions is greater than a predetermined threshold; and
resuming the data communication of the second application with the one or more base stations through the current carrier in response to determining that the number of the suspensions is greater than the predetermined threshold.

5. The method of claim 1, further comprising:
determining that the RAT used on the first carrier is the first preferred RAT; and
allowing, in response to the determining that the RAT used on the first carrier is the first preferred RAT, the first application to communicate data on the first carrier.

6. The method of claim 1, further comprising:
executing a first determination that the RAT used on the first carrier is higher than the first preferred RAT;
executing a second determination that a second carrier using the first preferred RAT is available;
using, in response to the first determination and the second determination, the second carrier and allowing the first application to communicate data with the one or more base stations on the second carrier.

7. The method of claim 1, further comprising configuring the first preferred RAT of the first application.

8. An apparatus for wireless communication with one or more base stations, the apparatus being a user equipment (UE), comprising:
means for determining a first preferred radio access technology (RAT) of a first application;
means for determining a RAT used on a first carrier in communication with the one or more base stations;
means for selectively allowing and disallowing the first application to communicate data with the one or more base stations on the first carrier based on the RAT used on the first carrier and the first preferred RAT;
means for executing a first determination that the RAT used on the first carrier is lower than the first preferred RAT;
means for executing a second determination that a second carrier is available, wherein the second carrier is in communication with the one or more base stations using the first preferred RAT;
means for using, in response to the first determination and the second determination, the second carrier and allowing the first application to communicate data with the one or more base stations on the second carrier; and
suspending data communication of a second application with the one or more base stations for a predetermined time period unless an interruption occurs, wherein a second preferred RAT of the second application is lower than an RAT used on the second carrier.

9. The apparatus of claim 8, further comprising:
means for interrupting, in response to a request, the suspension in the predetermined time period; and
means for resuming the data communication of the second application with the one or more base stations on the second carrier.

10. The apparatus of claim 8, further comprising:
means for determining a current RAT on a current carrier in communication with the one or more base stations after the predetermined time period;
means for determining whether the second preferred RAT is lower than the current RAT;
means for resuming, in response to determining that the second preferred RAT is not lower than the current RAT, the data communication of the second application on the current carrier with the one or more base stations; and
means for suspending, in response to determining that the second preferred RAT is lower than the current RAT, the data communication of the second application with the one or more base stations for another predetermined time period unless an interruption occurs.

11. The apparatus of claim 10, further comprising:
means for determining that a number of the suspensions is greater than a predetermined threshold; and
means for resuming the data communication of the second application with the one or more base stations through the current carrier in response to determining that the number of the suspensions is greater than the predetermined threshold.

12. The apparatus of claim 8, further comprising:
means for determining that the RAT used on the first carrier is the first preferred RAT; and
means for allowing, in response to the determining that the RAT used on the first carrier is the first preferred RAT, the first application to communicate data on the first carrier.

13. The apparatus of claim 8 further comprising:
means for executing a first determination that the RAT used on the first carrier is higher than the first preferred RAT;
means for executing a second determination that a second carrier using the first preferred RAT is available;
means for using, in response to the first determination and the second determination, the second carrier and allowing the first application to communicate data with the one or more base stations on the second carrier.

14. The apparatus of claim 8, further comprising means for configuring the first preferred RAT of the first application.

15. An apparatus for wireless communication with one or more base stations, comprising:
a memory; and
at least one processor coupled to the memory and configured to:
determine a first preferred radio access technology (RAT) of a first application;
determine an RAT used on a first carrier in communication with the one or more base stations;
selectively allow and disallow the first application to communicate data with the one or more base stations on the first carrier based on the RAT used on the first carrier and the first preferred RAT
execute a first determination that the RAT used on the first carrier is lower than the first preferred RAT;

execute a second determination that a second carrier is available, wherein the second carrier is in communication with the one or more base stations using the first preferred RAT;

use, in response to the first determination and the second determination, the second carrier and allow the first application to communicate data with the one or more base stations on the second carrier; and suspend data communication of a second application with the one or more base stations for a predetermined time period unless an interruption occurs, wherein a second preferred RAT of the second application is lower than an RAT used on the second carrier.

16. The apparatus of claim 15, wherein the at least one processor is configured to:

interrupt, in response to a request, the suspension in the predetermined time period; and resume the data communication of the second application with the one or more base stations on the second carrier.

17. The apparatus of claim 15, wherein the at least one processor is configured to:

determine a current RAT on a current carrier in communication with the one or more base stations after the predetermined time period;

determine whether the second preferred RAT is lower than the current RAT;

resume, in response to determining that the second preferred RAT is not lower than the current RAT, the data communication of the second application on the current carrier with the one or more base stations; and suspend, in response to determining that the second preferred RAT is lower than the current RAT, the data communication of the second application with the one or more base stations for another predetermined time period unless an interruption occurs.

18. The apparatus of claim 17, wherein the at least one processor is further configured to:

determine that a number of the suspensions is greater than a predetermined threshold; and resume the data communication of the second application with the one or more base stations through the current carrier in response to determining that the number of the suspensions is greater than the predetermined threshold.

19. The apparatus of claim 15, wherein the at least one processor is further configured to:

determine that the RAT used on the first carrier is the first preferred RAT; and allow, in response to the determining that the RAT used on the first carrier is the first preferred RAT, the first application to communicate data on the first carrier.

20. The apparatus of claim 15, wherein the at least one processor is further configured to:

execute a first determination that the RAT used on the first carrier is higher than the first preferred RAT;

execute a second determination that a second carrier using the first preferred RAT is available;

use, in response to the first determination and the second determination, the second carrier and allow the first application to communicate data with the one or more base stations on the second carrier.

21. The apparatus of claim 15, wherein the at least one processor is further configured to configure the first preferred RAT of the first application.

22. A non-transitory computer-readable medium storing computer executable code, comprising code for:

determining a first preferred radio access technology (RAT) of a first application;

determining an RAT used on a first carrier in communication with the one or more base stations; and selectively allowing and disallow the first application to communicate data with the one or more base stations on the first carrier based on the RAT used on the first carrier and the first preferred RAT executing a first determination that the RAT used on the first carrier is lower than the first preferred RAT;

executing a second determination that a second carrier is available, wherein the second carrier is in communication with the one or more base stations using the first preferred RAT;

using, in response to the first determination and the second determination, the second carrier and allowing the first application to communicate data with the one or more base stations on the second carrier; and suspending data communication of a second application with the one or more base stations for a predetermined time period unless an interruption occurs, wherein a second preferred RAT of the second application is lower than an RAT used on the second carrier.

* * * * *